Sept. 28, 1937.                F. R. BICHOWSKY                2,094,342
                                   COOLING AIR
                               Filed June 19, 1935
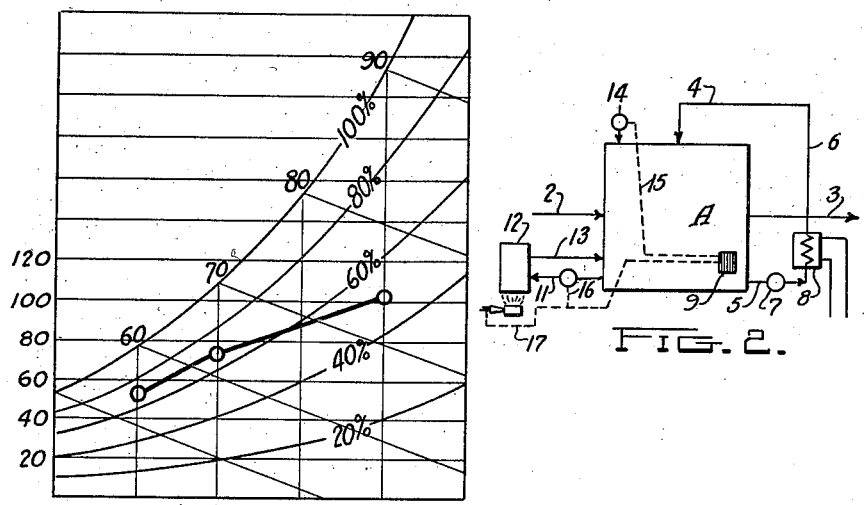
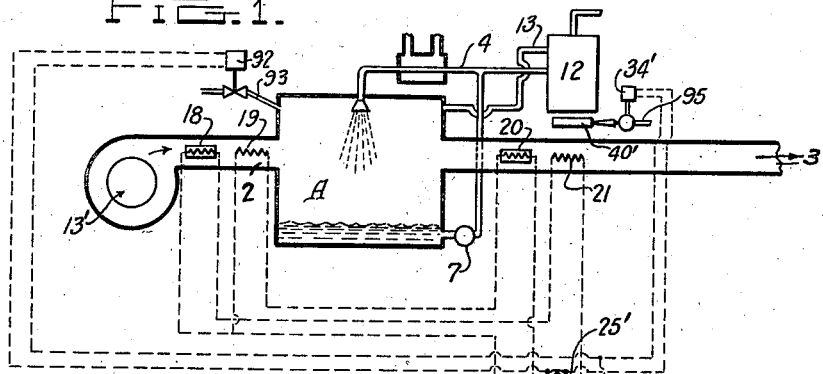
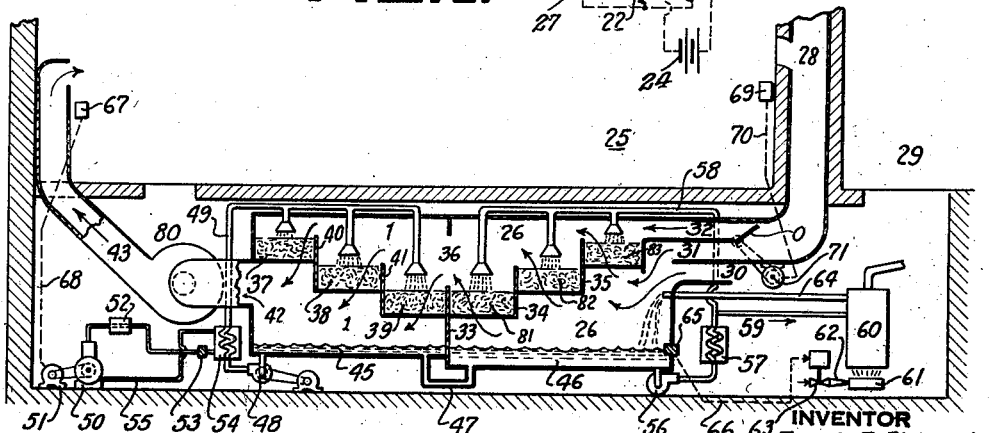
INVENTOR
Francis R. Bichowsky
BY
ATTORNEY Patented Sept. 28, 1937

2,094,342

UNITED STATES PATENT OFFICE 2,094,342

COOLING AIR

Francis R. Bichowsky, Toledo, Ohio

Application June 19, 1935, Serial No. 27,452

7 Claims. (Cl. 261—11)

This invention relates to the cooling of air and has particular application to the cooling of air by means of an aqueous solution without changing the moisture content of said air.

Objects of the invention include, the provision of a method of and means for cooling gas by contacting said gas with a water containing liquid without substantially changing the dew point of the gas in the cooling process.

In the art of conditioning gases, it is frequently desirable to cool the gases without, at the same time, changing their moisture content. The usual method of doing this is to pass the gas or air in contact with a surface which is cooled to such a temperature that no part of the surface has a temperature below the dew point of the air. In order to get satisfactory cooling of air with surfaces of this type, it is necessary that they be greatly extended and such extended surfaces are expensive to construct and offer considerable resistance to the passage of air.

I have discovered that under suitable conditions it is possible to cool the air without changing its moisture content, by circulating the air in contact with a suitable cooled aqueous solution. I have found that the contact between the air and the cooled solution can be made in any of the usual ways, as for example, in a spray tower or in a packed tower. If air of a given condition, for example, air at 90° F. containing 100 grains of moisture per pound is passed through a tower in contact with a given aqueous liquid, say an aqueous solution at 60° F., and of such concentration that the equilibrium moisture content of air at 60° F. in contact with the solution is 50 grains per pound, the air will leave the tower in some condition, usually that represented by a point lying near the line connecting the points representing the condition of the inlet air and the condition of the inlet liquid on a psychrometric chart, such as that illustrated in the accompanying drawing. For example, the air may leave the tower at 70° F. and with a moisture content of 70 grains per pound. The thermal efficiency of the tower is defined as the ratio of the difference between the inlet and outlet temperature of the air, to the difference between the inlet temperature of the air and the inlet temperature of the liquid solution. The moisture efficiency of the tower is defined as the ratio of the difference between the moisture content of the outlet air and the moisture content of the inlet air, to the difference between the moisture content of the inlet air and the moisture content of air in equilibrium with the solution.

The invention will now be described with particular relation to the accompanying drawing, wherein Fig. 1 represents a psychrometric chart illustrating a mode of operation of the invention.

Fig. 2 shows diagrammatically an apparatus for practicing the invention.

Fig. 3 is a diagrammatic view of a modified form of apparatus for practicing the invention with part of the apparatus shown in section.

Fig. 4 shows diagrammatically an application of the invention in modified form in connection with an enclosure, air from which is dried in one chamber and cooled in another.

The psychrometric chart of Fig. 1 is in standard form. It represents various conditions of temperature and moisture content that a given sample of air may assume. Temperature is plotted horizontally in degrees Fahrenheit, and moisture content is plotted vertically in grains of moisture per pound of air. The upper curved line represents the moisture content of saturated air at various temperatures, and the curved lines below represent the moisture content of air at relative humidities ranging from 20% to 80%, each curved line representing a single percentage relative humidity. The three points on the chart, indicated by circles and connected by a heavy line, are intended to represent the temperature and humidity condition of three different samples of air. The left hand point of the three represents the temperature and moisture content that a sample of air would have if it were exactly in equilibrium with the liquid entering a tower; the right hand point represents the temperature and moisture content of air entering the tower; and the middle point represents the temperature and moisture content of air leaving the tower. In the case represented by these three points, the thermal efficiency of the tower is (90–70)/(90–60) which equals .67 or 67%, and the moisture efficiency is (100–70)/(100–50) which equals .60 or 60%.

If, now, in the practice of the invention, air having a moisture content of 60 grains per pound and a temperature of 90° F. is to be cooled to about 71° F., and there is available a tower with a thermal efficiency of 50% and a moisture efficiency of 50%, a liquid may be used which has a temperature of 53° F. and which is at equilibrium with air at 53° F., having a moisture content of 60 grains per pound. The air will thereby be cooled without precipitation, and the minimum amount of cooling agent will be used. The psychrometric chart of Fig. 1 shows that pure water at 53° F. is in equilibrium with air at 53° F. containing 60 grains of moisture per pound, the curved line for 100% relative humidity intersecting the horizontal line for 60 grains of moisture per pound at a point representing a temperature of 53° F. Therefore, in the case outlined it is possible to use pure water as the cooling agent.

If, however, the tower available for cooling the air to 71° F. has a moisture and thermal efficiency of 75%, water could not be used to cool air entering at 90° F. and 60 grains per pound to the desired temperature without adding substantial amounts of moisture to the air. If water at 53° F. were employed as the cooling agent, the air would be delivered at 62°. If, on the other hand, water at 65° F. should be employed, the air would be delivered at 71° F. but with a moisture content of approximately 84 grains per pound. When, instead of water, an aqueous solution that is in equilibrium with air containing 60 grains of moisture per pound at a temperature of 65° F. is used in the tower to cool the air to 71° F., the moisture content of the air is not changed. Furthermore, the air is cooled with the minimum expenditure of cooling power that is possible with the given tower. For the properties of two such solutions, see the patent to Bichowsky, No. 1,992,177.

Referring now to Fig. 2 which shows diagrammatically one form of apparatus embodying the invention, air entering the chamber A through the path 2 and leaving said chamber through the path 3 is contacted in chamber A with a cooled aqueous solution, entering through the path 4 and leaving through the path 5. Preferably the solution, leaving through the path 5 is returned by means of the pump 7 back to the path 4 for reuse. At some point in the passage of the liquid entering the chamber A by way of the path 4, cooling means may be employed to cool the liquid. For example, this means may be a vessel 8 containing an evaporative refrigerant in heat exchange relation with the liquid traveling to the path 4. A control element 9 is so arranged to control the concentration of the solution circulated in contact with the air or the degree of contact between the liquid and the air. The control element may be responsive to (I) changes in the dew point of the entering air, or (II) changes in density of the solution; and it may effect the control, (a) by controlling the degree of gas liquid contact and hence the efficiency, or (b) by causing water to be added through pipe 14 to compensate for evaporation, or (c) by causing solution to be withdrawn through pipe 11 to evaporator 12 where surplus water caused by condensation is evaporated, the concentrated solution being then returned through pipe 13. The means 15, 16 and 17 diagrammatically indicate respectively control of inlet valve 14, control of a pump for recirculating the liquid, and control of the evaporator burner.

Fig. 3 shows diagrammatically another form of apparatus for practicing the invention, parts having similar functions being numbered as in Fig. 2. In Fig. 3, air to be cooled is passed into space A through the duct 2 by means of the fan 13'. In the duct 2 is placed one arm of a differential device sensitive to changes in the dew point of the air entering the chamber A and changes in the dew point of the air leaving the chamber A by way of the outlet tube 3. The inlet tube arm of said differential dew point control may consist of a protected resistance thermometer 18 and an unprotected resistance thermometer 19. By protected thermometer is meant one which is exposed to dry air only, being sealed tightly in a case, and by unprotected thermometer is meant one in which the temperature element is exposed to the moisture bearing air in the duct. Identical control elements 20 and 21 are placed in the outlet duct 3. If there is any change in the dew point of the air in passing from the inlet elements 18 and 19 to the outlet elements 20 and 21, the amounts of heat conducted away from the elements 20 and 21 will differ because of the fact that moist air is thermally more heat conductive than dry air. Protected element 18 in the inlet is connected in series with the unprotected element 21 in the outlet and the unprotected element 19 in the inlet is connected in series with the protected element 20 in the outlet, so that any change in temperature of the air stream between the inlet and outlet will be compensated for.

The two sets of resistance elements are connected to form the two variable arms of a Wheatstone bridge, or similar device, the other arms being provided by the fixed resistances 22 and 23. Across the arms of the bridge there is placed in the usual manner a source of current 27 and a polarized relay 25' so connected that when the dew point on the inlet end is higher than the dew point on the outlet end, the circuit from the source of power 24 will be connected through the relay 25' and through the solenoid valve 92 and thus supply water through the pipe 93 to the space A. The other arm of the relay 25' may be so connected that when the dew point of the air increases in passing through the space A, contact will be made so that an electric circuit will be completed through the solenoid valve at 34'; so that the supply of heat to the boiler 12 will be increased, for example, by increasing the supply of gas to the burner 40' through the pipe 95, thus concentrating the solution more rapidly.

The method of this invention has an especial application in connection with air conditioning systems in which the air is first dried and then cooled. Fig. 4 shows the joint use of this method of cooling with drying systems using aqueous solutions as drying agents. Fig. 4 shows diagrammatically the system of air conditioning in which air is dried in the chamber 26, and cooled in the chamber 1. In accordance with this invention air to be conditioned, which air may be drawn from the room 25 through the duct 28, and which may partly be drawn from the outside through the opening 29 and the duct 30, may be led into the chamber 26 through the openings 30, 31 and 32. These openings may be provided with shutters to regulate the amount of flow entering respectively in the openings 30, 31 and 32, only the shutter 0 being shown. The chamber 26 may be divided into two parts by pads of glass wool which may be conveniently arranged in a staggered manner as shown. Partitions 33, 34 and 35 may be provided to direct the air flow so that air entering through the ports 30 and 31 is forced to flow through the bottom portion of the chamber 26 and upward through the paths shown by arrows into the upper portion of the chamber 26. Air from the upper chamber 26 is led through the port 36 into the upper portion of the chamber 1 which chamber is also divided into an upper and lower part by a series of glass wool pads 37, 38 and 39 separated by dividing partitions 40 and 41 and so arranged that air entering into the upper portion is forced to flow through the pads into the lower portion whence it is drawn through the port 42 by the fan 30 and discharged through the duct 43 back into the chamber 25.

The partition 33 separating the chamber 1 from the chamber 26 extends to the bottom so as to make two separate sumps 45 and 46, the sump 45 preferably having a smaller capacity. The sumps may be connected through a small opening or more preferably through a pipe 47. Liquid from the sump 45 flows out through the pump and the pipe 48 to the pipe 49 which is so arranged with branches as to distribute the liquid uniformly over glass pads 37, 38 and 39, and thus to place the liquid circulated through these pipes in direct thermal contact with the air passing from the upper portion of chamber 1 into the lower portion of said chamber. Means are provided for cooling the liquid circulating through the channels 48 and 49 which means may include an interchanger 54 which may be cooled in any manner. For example, a compressor 50 driven by the motor 51 may be provided, the refrigerant passing from the compressor being condensed to liquid by the condenser 52, then passing through the valve 53 into an evaporation space 54 which evaporating space is in heat exchange relation with the liquid flowing through the pipe 49. The expanded vapor from the space 54 may be led back through the compressor by the pipe 55.

The concentrated drying liquid in the sump 46 in the drying chamber 26 is led through the pump and pipe 56 through the cooler 57 (which may be a water cooler,) through pipe 58, whereby it is distributed uniformly over the glass pads 81, 82 and 83 in such a way as to be in intimate moisture exchange relationship with air passing from the bottom of the chamber 26 to the upper portion of the chamber 26 through the pads 81, 82 and 83. A by-pass 59 may be provided branching from the pipe 58 adapted to lead a portion of the liquid into the concentrator 60, which concentrator may be supplied with heat through the burner 61. Fuel for said burner may be led through the pipe 62 and the valve 63. Returned concentrated liquid from said concentrator is passed through the pipe 64 back into the sump 46. A control device 65 may be provided responsive to change in density of the liquid in the sump 46. This density control device may be connected by the connecting means 66 which connecting means may be an appropriate electrical circuit so that when the density of the liquid in the sump 46 falls below a certain point, the solenoid valve 63 is opened and heat is supplied through the burner 61 to the concentrator 60, thus concentrating and maintaining the liquid in the sump 46 at increased density. In place of the burner 61 any other source of heat may be used and controlled in the appropriate manner. With this arrangement, air passing into the bottom of the chamber 26 will be dried to a certain degree in passing in contact with the liquid in the pads 81, 82 and 83, and the dry air which will have its dew point lowered to a certain degree will pass into the chamber 1, where it will be cooled by the liquid circulating in contact with it in the pads 37, 38 and 39.

If, now, the concentration of the liquid circulating through the chamber 1 is such that moisture will be further extracted from the air in chamber 1, the amount of liquid in the sump 45 will increase thus diluting the liquid in the sump 45 so that there will come a time when it will no longer take up moisture from the air in chamber 1 and the air passing through chamber 1 will do so therefore without change in dew point.

This absorbed moisture will also cause a rise in the level of the liquid in the sump 45 and a consequent flow of liquid from sump 45 through pipe 47 into sump 46 because of the liquid seeking its own level. If, on the other hand, the air passing into the chamber 1 is dry enough so that a certain amount of moisture is evaporated from the liquid into the air, the amount of liquid in the sump 45 will decrease, causing a flow of concentrated liquid from the sump 46 through the pipe 47 and an increase in concentration of the liquid in sump 45 until the concentration therein is such that the liquid will no longer be evaporated into the air and there will be no change in the dew point of the air in passing through the chamber 1. If, now, the temperature of the liquid circulating through the circuit including the pipe 49 is controlled so that the temperature in the space 25 is maintained at a desirable value, the air discharged into the space 25 will have the correct temperature to maintain that space at its proper temperature and also will have a predetermined dew point.

In order to regulate the temperature of the liquid circulating through the circuit including pipe 49, a dry bulb thermostat 67 may be provided connected by the connecting means 68 to the motor 51, driving the compressor 50 in such a way that if the temperature in the space 25 falls below the desired temperature, the refrigeration to the cooler 54 will be stopped or decreased, and it furthermore may be connected in such a way that if the temperature in the space 25 lies above the desired amount, the supply of cooling fluid to the cooler 54 will be increased. It is usually not necessary to provide special controls to maintain the humidity at a desired value since the density control 65, which indirectly and automatically controls the dew point of the outlet air usually gives entirely satisfactory control of humidity conditions in the space 25. However, humidostat 69 connected by the means 70 to a means 71 for controlling the condition of the damper 0 may be provided allowing the passage of a certain portion of the air in some of the ducts 28 into the upper portion of the chamber 26, thus mixing a certain portion of the dried air passing upwardly in the chamber through the pads with a certain portion of undried air entering through the passage 32.

The method and operation of the apparatus selected for illustration as preferred embodiments of the invention have been clearly set forth in connection with the foregoing detailed description of the invention. Subject matter disclosed but not claimed in this application forms the subject of my copending application Serial No. 73,793 filed April 10, 1936. Modifications of structure embodying the invention will be apparent to those skilled in the art from the detailed description of the specification. However, it is to be understood that the words which have been used are words of description rather than of limitation and that changes within the purview of the claims may be made without departing from the true scope and spirit of the invention in all of its aspects.

I claim:

1. The method of cooling gas with a drying liquid containing water which comprises contacting said gas with said liquid, measuring the difference in dew point of said gas before and after contact with said liquid, changing the concentration of water in said liquid by adding water to said liquid or by concentrating said liquid in accordance with the changed dew point of said air.

2. An apparatus for cooling air including a chamber through which said air is circulated, means for contacting said air with a circulating stream of drying liquid, means responsive to the difference between the dew point of air entering said chamber and air leaving said chamber for controlling the addition of water to said liquid if the dew point of said air decreases in passing through said chamber, means for concentrating said liquid, and means for controlling the concentrating of said liquid when the dew point of said air increases in passing through the chamber.

3. An apparatus for cooling air comprising a chamber through which said air is circulated, means for contacting said air with a circulating stream of drying liquid, means responsive to the difference between the dew point of air entering said chamber and air leaving said chamber, said means including differential temperature compensated dew point responsive devices for controlling the addition of water to said liquid if the dew point of said air decreases in passing through said chamber, means for concentrating said liquid, and means for controlling the concentrating of said liquid when the dew point of said air increases in passing through the chamber.

4. An apparatus for cooling air including a chamber through which said air is circulated, means for circulating a stream of water-containing drying liquid in contact with the air passing through the chamber, means including a Wheatstone bridge arrangement responsive to the difference between the dew point of air entering said chamber and air leaving said chamber for controlling the addition of water to said liquid when the dew point of said air decreases in passing through the chamber, means for concentrating the said liquid, and means for controlling the concentrating means to maintain the liquid at such a concentration and temperature as to be in equilibrium with the air passing through the chamber.

5. An apparatus for cooling air comprising a chamber through which the air to be cooled is circulated, means for circulating a stream of water-containing drying liquid in contact with the air in the chamber, means for decreasing the concentration of the liquid by adding water thereto, means for concentrating the liquid when the volume thereof increases, and means responsive to the difference between the dew point of air entering said chamber and air leaving said cramber for controlling the operation of the water adding means and the concentrating means.

6. An apparatus for cooling air without substantially changing the dew point of the air which comprises, a chamber, means for circulating air through the chamber, a body of water-containing drying liquid associated with said chamber, means for circulating a stream of the said liquid in contact with air passing through the chamber, and means for controlling the water content of the said liquid as the dew point of the air entering and leaving the chamber varies.

7. An apparatus for cooling air without substantially changing the dew point of the air which comprises, a chamber, means for flowing air through the chamber, means for circulating a cooled stream of water-containing drying liquid in contact with air passing through the chamber, and means for controlling the water content of the said liquid in response to difference in dew points of air entering and leaving said chamber, said means including a normally balanced electrical control circuit having differentially connected elements in the air inlet and in the air outlet of said chamber.

FRANCIS R. BICHOWSKY.